Sept. 1, 1931.  R. B. DAY  1,821,619
BUBBLE CAP
Filed Sept. 24, 1929
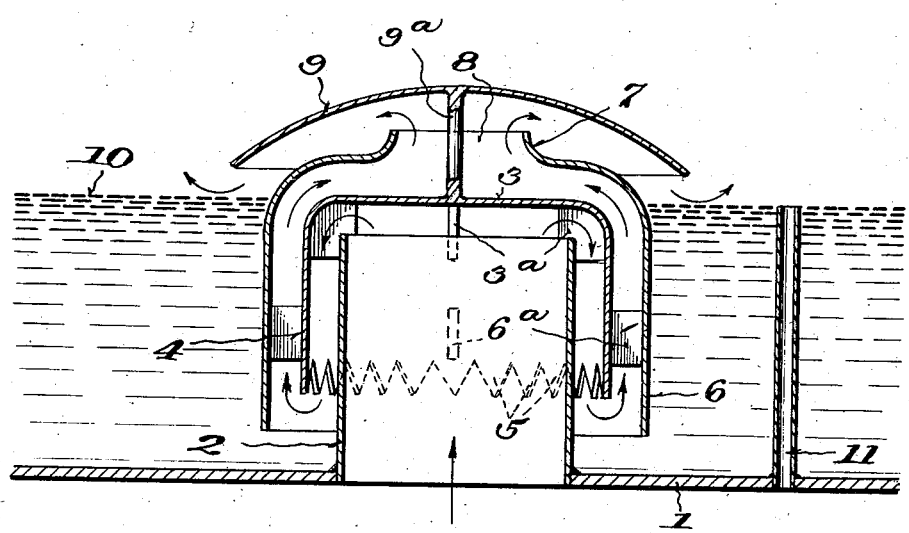
Inventor
Roland B. Day.
By Stone, Boyden, Mack & Hahn
Attorneys.

Patented Sept. 1, 1931

1,821,619

UNITED STATES PATENT OFFICE

ROLAND B. DAY, OF LOS ANGELES, CALIFORNIA

BUBBLE-CAP

Application filed September 24, 1929. Serial No. 394,763.

This invention relates to improvements in apparatus for effecting contact and heat transfer between vapors and liquids. The improved apparatus of the invention is of special value and application in connection with the fractionation of hydrocarbon oils and with the scrubbing of hydrocarbon gases or vapors with liquid hydrocarbons or other liquid absorbents.

It is the usual practice to employ fractionating towers for fractionating hydrocarbon oil vapors, the vapors passing through the tower and being fractionally condensed therein, the heavier fractions being condensed and drawn off, the lighter fractions remaining as vapors and passing through uncondensed. In such operations, the efficiency of the fractionation is dependent, to a substantial extent, upon the intimacy of contact as well as time of contact between vapor and liquid constituents undergoing fractionation, prolonged and intimate contact resulting in thorough heat transfer between vapor and liquid, and further resulting in less refluxing and better fractionation. Among various means which have been proposed to promote the intimacy of contact, bubble caps or plates have been widely employed.

This invention relates particularly to improvements in apparatus of this general character for promoting intimacy and length of contact and consequent thermal exchange between liquid and vapor constituents undergoing fractionation, and the invention provides an improved bubble cap with this object in view. Other objects and advantages of the invention are set forth in the following description and claims.

Heretofore the ordinary type of bubble cap, consisting of a single casting in the form of a cup which fits over an upright pipe projecting about 3" or 4" above the bubble-tray, has certain marked disadvantages. The rim of the bubble-cap, which is usually serrated or contains slots, causes the breaking up of the vapor stream which rises through the upright pipe, and is deflected downwardly by the cap into a large number of fine bubbles, which flow upward through the liquid on the bubble-tray, tending to form a continuous stream as a jet or geyser around each bubble-cap. It will be obvious that a comparatively high vapor velocity will result in splashing as the bubbles break at the surface of the liquid. This splashing action necessitates a tray spacing of from 24" to 30" in order to prevent hot entrained liquids carrying from one tray to the next higher and cooler tray and thus disturbing the constantly decreasing temperature gradient which must prevail from the bottom to the top of the tower in order to secure maximum thermal efficiency and effectiveness of fractionation. A further difficulty lies in the fact that it is not possible to secure a very efficient thermal contact between the vapor and liquid, since the thermal conductivity is relatively low. The time factor is extremely short, and, undoubtedly, the heat contained in the center of each bubble is never liberated to the liquid. Moreover, in operating at maximum capacity, the vapor velocity becomes so high that a continuous stream of vapor, rather than bubbles, results.

The improved bubble cap of this invention has several important advantages. The improved construction provides for positive contact between vapor and liquid constituents, secures complete mixtures of vapors and liquid, and prevents splashing of liquids from one tray to the next higher, thus securing an economy of space by allowing the trays to be spaced more closely together, namely about 15" to 18" apart, thus materially reducing the height of the tower and its consequent cost. More perfect contact further results in better fractionation and less refluxing, giving a tower of any given cross-section a higher capacity.

The invention will be further described in connection with the accompanying drawing which illustrates in a diagrammatic and conventional manner apparatus embodying the invention and adapted for operation in accordance with the invention. It is intended and will be understood that this illustration and the further more detailed description are for the purpose of exemplification and the invention is not limited to the particular configuration illustrated. The single figure of drawing illustrates a portion of a tower broken away to show a bubble-cap constructed in accordance with the invention, the bubble-cap being shown in vertical section.

Referring to the drawing, the improved bubble-cap structure comprises a liquid retaining means in the form of a horizontal bubble tray 1, having a plurality of openings therein, each opening having its wall formed annularly as a single piece, and extending upwardly therefrom as a pipe 2 having a passageway extending therethrough. In the embodiment illustrated, the passageway is of uniform diameter, and opens at the top of the pipe. Positioned above the upper end of pipe 2 and extending across the same is a primary baffle 3 having an annular flange 4 extending downwardly and running parallel to pipe 2 and spaced therefrom and from the tray 1, said flange having a serrated edge 5. A second annular baffle 6 surrounds the primary baffle 3 adjacent the flanged portion 4, and is spaced therefrom and also from the tray 1, although this second baffle 6 extends nearer the tray 1 than the flange 4 of the primary baffle 3. This second baffle 6 extends upwardly above primary baffle 3, and is curved inwardly, then upwardly at 7 to form a central opening or orifice 8 at the top having a vertical rim. A third baffle 9 in the form of a cover plate extends across this central opening and is positioned slightly above the same, and curves downward laterally in the form of an inverted shallow cup. The liquid on the tray 1 is maintained at a fixed level 10 below the opening 8 by means of vertical draw-off pipe 11, or other conventional means. The draw-off pipe 11 or other level maintaining means is preferably arranged to maintain the liquid level 10 above the level of the top of pipe 2 so as to cause a tendency of the liquid to overflow the pipe unless this tendency is overcome by gas or vapor pressure opposing the flow of liquid. In the embodiment illustrated, this result is accomplished by employing the draw-off pipe 11 having its upper opening located above the level of the top of pipe 2. This secures a thorough intermingling of gases or vapors and liquid when the bubble-tower is in operation, by causing a forced positive opposition of the gases or vapors and liquid.

The vapors rising through the pipe 2 strike the baffle 3 and are directed downwardly in an annular path and by the flange 4, escaping around the serrated edge 5, are broken up into small bubbles as they contact with the liquid on the tray which is continually pressing upwardly against the downward flow of vapors at this point by reason of the level of the liquid 10 on tray 1 being above the level of the top of pipe 2. These bubbles and liquid oil are then sharply diverted upwardly in an annular path by the second baffle 6, which, being spaced from the tray 1, serves to cause additional liquid to flow in under the bottom of the baffle 6 and upward with the vapor stream of bubbles, the latter serving as an injecting or lifting medium, the column consisting of bubbles and liquid in the annular space between baffles 6 and flange 5, tending to rise since it is lighter than a column of liquid. This liquid bubble mixture flows upwardly and inwardly toward centrally located orifice 8, where the vapor bubbles and liquid from all sides of the annular space intimately contact with one another, then strike third baffle 9, which prevents splashing and are thereby directed laterally and radially, the liquid being directed downward while the vapor passes upwardly to the next tray. At the opening 8 in the top of the second baffle 6, a zone of great turbulence exists, caused by the flow from all directions to a central point of the vapors and liquid. This results in a complete and thorough mixture of the two. The courses of the liquid and vapors are indicated schematically by arrows.

What I claim is:—

1. In a contact apparatus of the bubble cap type, the combination of a bubble tray having an opening therethrough, a wall of the the opening extending upwardly therefrom as a pipe having a passageway therethrough, a primary baffle positioned above the upper end of said pipe and having a downwardly extending flange spaced from the pipe and from the tray, and a second baffle surrounding said primary baffle adjacent the flange thereof and spaced therefrom and from the tray and extending upwardly and inwardly thereabove and having an opening at the top.

2. In a contact apparatus of the bubble-cap type, the combination of a bubble tray having an opening therethrough, a wall of the opening extending upwardly therefrom as a pipe having a passageway therethrough, a primary baffle positioned above the upper end of said pipe and having a downwardly extending flange spaced from the pipe and from the tray and a second baffle surrounding said primary baffle adjacent the flange thereof and spaced therefrom and from the tray, and extending upwardly and inwardly thereabove and having an opening at the top, said second baffle having its walls curved upwardly adjacent said opening.

3. In a contact apparatus of the bubble-cap type, the combination of a bubble tray having an opening therethrough, a wall of the opening extending upwardly therefrom as a pipe having a passageway therethrough, a primary baffle positioned above the upper end of said pipe and having a downwardly extending flange spaced from the pipe and from the tray, a second baffle surrounding said primary baffle adjacent the flange thereof and spaced therefrom and from the tray and extending upwardly and inwardly thereabove and having an opening at the top, and a third baffle extending across said opening and positioned thereabove.

4. In a contact apparatus of the bubble cap type, the combination of a bubble tray having an opening therethrough, a wall of the opening extending upwardly therefrom as a pipe having a passageway therethrough, a primary baffle positioned above the upper end of said pipe and having a downwardly extending flange spaced from the pipe and from the tray, a second baffle surrounding said primary baffle adjacent the flange thereof, and spaced therefrom and from the tray, and extending upwardly and inwardly thereabove and having an opening at the top, said second baffle having its walls curved upwardly adjacent said opening, and a third baffle extending across said opening and positioned thereabove.

5. In a contact apparatus of the bubble cap type, the combination of a bubble tray having an opening therethrough, a wall of the opening extending upwardly therefrom as a pipe having a passageway therethrough, a primary baffle positioned above the upper end of said pipe and having a downwardly extending flange spaced from the pipe and from the tray, a second baffle surrounding said primary baffle adjacent the flange thereof and spaced therefrom and from the tray, and extending upwardly and inwardly thereabove and having an opening at the top, and means for maintaining the level of liquid on the tray below the opening at the top of the second baffle.

6. In a contact apparatus of the bubble-cap type, the combination of a bubble tray having an opening therethrough, a wall of the opening extending upwardly therefrom as a pipe having a passageway therethrough, a primary baffle positioned above the upper end of said pipe and having a downwardly extending flange spaced from the pipe and from the tray, a second baffle surrounding said primary baffle adjacent the flange thereof and spaced therefrom and from the tray, and extending upwardly and inwardly thereabove and having an opening at the top, said second baffle having its walls curved upwardly adjacent said opening and means for maintaining the level of liquid on the tray below the opening at the top of the second baffle.

7. In a contact apparatus of the bubble-cap type, the combination of a bubble tray having an opening therethrough, a wall of the opening extending upwardly therefrom as a pipe having a passage-way therethrough, a primary baffle positioned above the upper end of said pipe and having a downwardly extending flange spaced from the pipe and from the tray, a second baffle surrounding said primary baffle adjacent the flange thereof, and spaced therefrom and from the tray and extending upwardly and inwardly thereabove and having an opening at the top, and a third baffle extending across said opening and positioned thereabove and means for maintaining the level of liquid on the tray below the opening at the top of the second baffle.

8. In a contact apparatus of the bubble-cap type, the combination of a bubble tray having an opening therethrough, a wall of the opening extending upwardly therefrom as a pipe having a passageway therethrough, a primary baffle positioned above the upper end of said pipe and having a downwardly extending flange spaced from the pipe and from the tray, a second baffle surrounding said primary baffle adjacent the flange thereof, and spaced therefrom and from the tray, and extending upwardly and inwardly thereabove and having an opening at the top, said second baffle having its walls curved upwardly adjacent said opening, a third baffle extending across said opening and positioned thereabove, and means for maintaining the level of liquid on the tray below the opening at the top of the second baffle.

9. In a contact apparatus of the bubble-cap type, the combination of a bubble tray having an opening therethrough, a wall of the opening extending upwardly therefrom as a pipe having a passageway therethrough, a primary baffle positioned above the upper end of said pipe and having a downwardly extending flange spaced from the pipe and from the tray, a second baffle surrounding said primary baffle adjacent the flange thereof and spaced therefrom and from the tray, and extending upwardly and inwardly thereabove and having an opening at the top, and a third baffle extending across said opening and positioned thereabove and curving downward laterally.

10. In a contact apparatus of the bubble-cap type, the combination of a bubble tray having an opening therethrough, a wall of the opening extending upwardly therefrom as a pipe having a passageway therethrough, a primary baffle positioned above the upper end of said pipe and having a downwardly extending flange spaced from the pipe and from the tray, a second baffle surrounding said primary baffle adjacent the flange thereof, and spaced therefrom and from the tray, and extending upwardly and inwardly thereabove and having an opening at the top, said second baffle having its walls curved upwardly adjacent said opening and a third baffle extending across said opening and positioned thereabove and curving downward laterally.

11. In an apparatus for causing contact between liquids and vapors, liquid retaining means, vapor-conducting means for leading vapors upwardly through said liquid retaining means, means for directing said vapors downwardly in an annular path, in contact with liquid on said liquid retaining means, means associated with said vapor-conducting means for causing dissemination of said vapors into the form of bubbles directed downwardly and outwardly, means for sharply diverting said bubbles upwardly in an annular path as soon as they are formed and for causing entrainment of additional liquid therewith, means for directing said bubbles and liquid inwardly toward a centrally located orifice through which the material treated may pass, and means for then directing said material radially outwardly.

In testimony whereof I affix my signature.

ROLAND B. DAY.